US011895011B2

(12) United States Patent
Tang

(10) Patent No.: US 11,895,011 B2
(45) Date of Patent: *Feb. 6, 2024

(54) DATA TRANSMISSION METHOD AND RELATED PRODUCT

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/508,950

(22) Filed: Oct. 22, 2021

(65) Prior Publication Data
US 2022/0045935 A1 Feb. 10, 2022

Related U.S. Application Data

(63) Continuation of application No. 16/619,934, filed as application No. PCT/CN2017/094994 on Jul. 28, 2017, now Pat. No. 11,196,662.

(51) Int. Cl.
*H04W 56/00* (2009.01)
*H04L 45/16* (2022.01)
(Continued)

(52) U.S. Cl.
CPC ............. *H04L 45/16* (2013.01); *H04W 76/15* (2018.02); *H04W 80/02* (2013.01)

(58) Field of Classification Search
CPC ........ H04L 45/16; H04W 76/15; H04W 80/02
(Continued)

(56) References Cited

U.S. PATENT DOCUMENTS

2008/0310367 A1* 12/2008 Meylan ................. H04W 36/02
370/331
2016/0309526 A1 10/2016 Quan et al.
(Continued)

FOREIGN PATENT DOCUMENTS

CN 103858476 6/2014
EP 3606132 A1 8/2021
(Continued)

OTHER PUBLICATIONS

Huawei, HiSilicon, PDCP operation for packet duplication, 3GPP TSG-RAN WG2 NR Ad Hoc, R2-1706483 (Year: 2017).*
(Continued)

*Primary Examiner* — Sai Ming Chan
(74) *Attorney, Agent, or Firm* — Hodgson Russ LLP

(57) ABSTRACT

Disclosed are a data transmission method and a related product. The method includes: when it is detected that a data replication transmission function of a PDCP layer entity is activated, a terminal enabling a first RLC layer entity, a second RLC layer entity being in an enabled status; and invoking the PDCP layer entity to determine a first PDCP PDU associated with a first PDCP SDU, and sending the first PDCP PDU to the first RLC layer entity, wherein the first PDCP PDU is used for the first RLC layer entity and a MAC layer entity to process the first PDCP PDU into a MAC PDU and send same.

10 Claims, 10 Drawing Sheets

(51) Int. Cl.
*H04W 76/15* (2018.01)
*H04W 80/02* (2009.01)

(58) Field of Classification Search
USPC .......................................... 370/312
See application file for complete search history.

(56) References Cited

U.S. PATENT DOCUMENTS

| | | | |
|---|---|---|---|
| 2017/0099128 A1 | 4/2017 | Gao et al. | |
| 2018/0279163 A1* | 9/2018 | Wu | H04W 28/0252 |
| 2020/0007281 A1* | 1/2020 | Kilinc | H04W 76/15 |

FOREIGN PATENT DOCUMENTS

| | | |
|---|---|---|
| JP | 2017524289 | 8/2017 |
| JP | 2017524289 A | 8/2017 |
| KR | 20170020441 | 2/2017 |

OTHER PUBLICATIONS

CIPO, Office Action issued in CA Application No. 3066175, dated Feb. 28, 2022.
Cipo, Office Action issued in CA Application No. 3006175, dated Feb. 28, 2022.
Indonesia Patent Office, Office Action issued in ID Application No. P-00202000086, dated Apr. 14, 2022.
JPO, Decision to Grant a Patent issued in JP Application No. 2019-570010, dated Mar. 25, 2022.
Israel Patent Office, Notice of Defects issued in IL Patent Application No. 271056, dated Mar. 30, 2022.
EPO, Extended European Search Report for EP Application No. 21188723.7, dated Oct. 20, 2021.
KIPO, Office Action for KR Application No. 10-2019-7037209, dated Nov. 11, 2021.
JPO, Office Action for JP Application No. 2019-570010, dated Dec. 10, 2021.
IPI, Office Action for IN Application No. 201917054440, dated Oct. 8, 2021.
INAPI, Office Action for CL Application No. 202000006, dated Aug. 13, 2021.
Huawei et al., "RLC behavior in duplicate activation and deactivation," 3GPP TSG RAN WG2 AH, R2-1707249, Jun. 2017.
TIPO, Office Action for TW Application No. 107126246, dated Dec. 7, 2021.
IPA, Office Action for AU Application No. 2017424814, dated May 3, 2023.
NOIP, Office Action for VN Application No. 1-2019-07137, dated Apr. 3, 2023.
IPA, Office Action for AU Application No. 2017424814, dated Jan. 13, 2023.
IMPI, Office Action for MX Application No. MX/a/2019/015496, dated Feb. 8, 2023.
EPO, Communication for EP Application No. 21188723.7, dated Oct. 5, 2023.
DGIP, Office Action for ID Application No. P00202000086, dated Nov. 7, 2023.
IPI, Office Action for IN Application No. 201917054440, dated Sep. 22, 2023.

* cited by examiner

DATA TRANSMISSION METHOD AND RELATED PRODUCT

CROSS-REFERENCE TO RELATED APPLICATION

This application is a continuation of U.S. application Ser. No. 16/619,934, filed Dec. 5, 2019, which is a U.S. National Stage Entry of International Application No. PCT/CN2017/094994, filed Jul. 28, 2017, the entire disclosures of which are incorporated herein by reference.

TECHNICAL FIELD

The present disclosure relates to the technical field of communications, and more particularly, to a data transmission method and a related product.

BACKGROUND

Wide coverage of the 4$^{th}$ Generation (4G) Mobile Communication Network, such as Long Term Evolution (LTE) Network, has been achieved at present. 4G network is characterized by fast communication speed, wide network spectrum, flexible communication, and the like. However, with the emergence of network requirements such as the Internet of Things and the Internet of Vehicles, users are demanding more and more for next generation mobile communication networks, i.e., the 5$^{th}$ Generation (5G) Mobile Communication Network, for example, the user experience rate requiring continuous wide-area coverage of 100 megabytes per second (Mbps), the user experience rate of hot spots of 1 gigabyte per second (Gbps), the air interface delay within 1 millisecond (ms), the end-to-end delay within 100 ms, the reliability guarantee, etc.

In order to further improve the spectrum efficiency of the communication system and the data throughput of users, a Carrier Aggregation (CA) technology is introduced into a LTE-advanced (LTE-A) System. The carrier aggregation means that a User Equipment (UE) may use a plurality of Component Carriers (CC) for uplink and downlink communications at the same time, thus realizing high-speed data transmission.

At present, in a 5G New Radio (NR) System, a data duplication function of the Packet Data Convergence Protocol (PDCP) layer entity is utilized in the solution of the carrier aggregation technology supporting data duplication and transmission (Data Duplication), so that a duplicated PDCP Protocol Data Unit (PDCP PDU) is transmitted to two Radio Link Control (RLC) layer entities (the two RLC layer entities have different logical channels respectively) respectively, and finally it is ensured that the duplicated PDCP PDU can transmit data on different physical layer aggregation carriers.

SUMMARY

The embodiments of the present disclosure provide a data transmission method and a related product, so as to achieve a frequency diversity gain, and improve the reliability of data transmission.

According to a first aspect, the embodiments of the present disclosure provide a data transmission method applied to a terminal, wherein the terminal includes a PDCP layer entity, a first RLC layer entity, a second RLC layer entity and a MAC layer entity, and the method includes:

when detecting that a data duplication transmission function of the PDCP layer entity is activated, enabling the first RLC layer entity, wherein the second RLC layer entity is in an enabled status; and invoking the PDCP layer entity to determine a first PDCP PDU associated with a first PDCP SDU, and sending the first PDCP PDU to the first RLC layer entity, wherein the first PDCP PDU is configured for the first RLC layer entity and the MAC layer entity to process the first PDCP PDU into a MAC PDU and send the MAC PDU.

According to a second aspect, the embodiments of the present disclosure provide a data transmission method, including:

acquiring, by a network side device, a MAC PDU of a terminal, wherein the MAC PDU is obtained through processing a first PDCP PDU by a first RLC layer entity and a MAC layer entity, the first PDCP PDU is associated with a first PDCP SDU and determined by the terminal through enabling the first RLC layer entity and invoking a PDCP layer entity when detecting that a data duplication transmission function of the PDCP layer entity is activated, and the first PDCP PDU is sent by the terminal to the first RLC layer entity, a second RLC layer entity being in an enabled status.

According to a third aspect, the embodiments of the present disclosure provides a data transmission method applied to a terminal, wherein the terminal includes a PDCP layer entity, a first RLC layer entity, a second RLC layer entity and a MAC layer entity, and the method includes:

when detecting that a data duplication transmission function of the PDCP layer entity is activated, enabling the first RLC layer entity, wherein the second RLC layer entity is in an enabled status;

invoking the first RLC layer entity to receive a first RLC SDU from the second RLC layer entity; and invoking the first RLC layer entity and the MAC layer entity to process the first RLC SDU into a MAC PDU and send the MAC PDU.

According to a fourth aspect, the embodiments of the present disclosure provide a data transmission method, including:

acquiring, by a network side device, a MAC PDU of a terminal, wherein the MAC PDU is obtained through processing a first RLC SDU by a first RLC layer entity and a MAC layer entity, the first PDCP PDU is from a second RLC layer entity and received by the terminal through enabling the first RLC layer entity and invoking the first RLC layer entity when detecting that a data duplication transmission function of the PDCP layer entity is activated, the second RLC layer entity being in an enabled status.

According to a fifth aspect, the embodiments of the present disclosure provide a terminal having a function of implementing behaviors of the terminal in the above method design. The function may be implemented by hardware or by performing corresponding software by hardware. The hardware or software includes one or more modules corresponding to the above function.

In one possible design, the terminal includes a processor configured to support the terminal to perform the corresponding function in the above method. Further, the terminal may also include a transceiver for supporting communications between the terminal and a network side device. Further, the terminal may also include a memory for coupling with the processor, and storing program instructions and data necessary for the terminal.

According to a sixth aspect, the embodiments of the present disclosure provide a network side device having a function of implementing behaviors of the network side device in the above method design. The function may be implemented by hardware or by performing corresponding software by hardware. The hardware or software includes one or more modules corresponding to the above function.

In one possible design, the network side device includes a processor configured to support the network side device to perform the corresponding function in the above method. Further, the network side device may also include a transceiver for supporting communications between the network side device and a terminal. Further, the network side device may also include a memory for coupling with the processor, and storing program instructions and data necessary for the network side device.

According to a seventh aspect, the embodiments of the present disclosure provide a terminal including a processor, a memory, a communication interface, and one or more programs stored in the memory and configured to be executed by the processor, wherein the programs include instructions for performing steps in any method of the first aspect and/or any method of the third aspect according to the embodiments of the present disclosure.

According to an eighth aspect, the embodiments of the present disclosure provide a network side device including a processor, a memory, a transceiver, and one or more programs stored in the memory and configured to be executed by the processor, wherein the programs include instructions for performing steps in any method of the second aspect and/or any method of the fourth aspect according to the embodiments of the present disclosure.

According to a ninth aspect, the embodiments of the present disclosure provide a computer readable storage medium, wherein the computer readable storage medium stores a computer program for electronic data exchange, and the computer program enables a computer to perform some or all of the steps in any method of the first aspect and/or any method of the third aspect according to the embodiments of the present disclosure.

According to a tenth aspect, the embodiments of the present disclosure provide a computer readable storage medium, wherein the computer readable storage medium stores a computer program for electronic data exchange, and the computer program enables a computer to perform some or all of the steps in any method of the second aspect and/or any method of the fourth aspect according to the embodiments of the present disclosure.

According to an eleventh aspect, the embodiments of the present disclosure provide a computer program product, wherein the computer readable storage medium stores a non-transitory computer readable storage medium storing a computer program operable to enable a computer to perform some or all of the steps in any method of the first aspect and/or any method of the third aspect according to the embodiments of the present disclosure. The computer program product may be a software package.

According to a twelfth aspect, the embodiments of the present disclosure provide a computer program product, wherein the computer readable storage medium stores a non-transitory computer readable storage medium storing a computer program operable to enable a computer to perform some or all of the steps in any method of the second aspect and/or any method of the fourth aspect according to the embodiments of the present disclosure. The computer program product may be a software package.

It can be seen that in the embodiments of the present disclosure, the terminal, firstly, enables the first RLC layer entity when detecting that the data duplication transmission function of the PDCP layer entity is activated, wherein the second RLC layer entity is in an enabled status; and secondly, invokes the PDCP layer entity to determine the first PDCP PDU associated with the first PDCP SDU, and sends the first PDCP PDU to the first RLC layer entity, wherein the first PDCP PDU is configured for the first RLC layer entity and the MAC layer entity to process the first PDCP PDU into the MAC PDU and send the MAC PDU. It can be seen that when the data duplication transmission function of the PDCP layer entity is activated, the first PDCP PDU associated with the first PDCP SDU that needs to be duplicated and transmitted is determined by the PDCP layer entity and sent to the first RLC layer entity. When the second RLC layer entity transmits the data packet, the same data packet of the first RLC layer entity is transmitted, thus implementing the duplication and transmission of the first PDCP SDU, and enabling the first PDCP SDU to be transmitted on two logical channels, which is beneficial for implementing the frequency diversity gain of data transmission and improving the reliability of data transmission.

BRIEF DESCRIPTION OF THE DRAWINGS

The drawings needed in the description of the embodiments or the related art will be introduced briefly below.

DETAILED DESCRIPTION

The technical solutions in the embodiments of the present disclosure will be described hereinafter with reference to the drawings.

Figure 1:
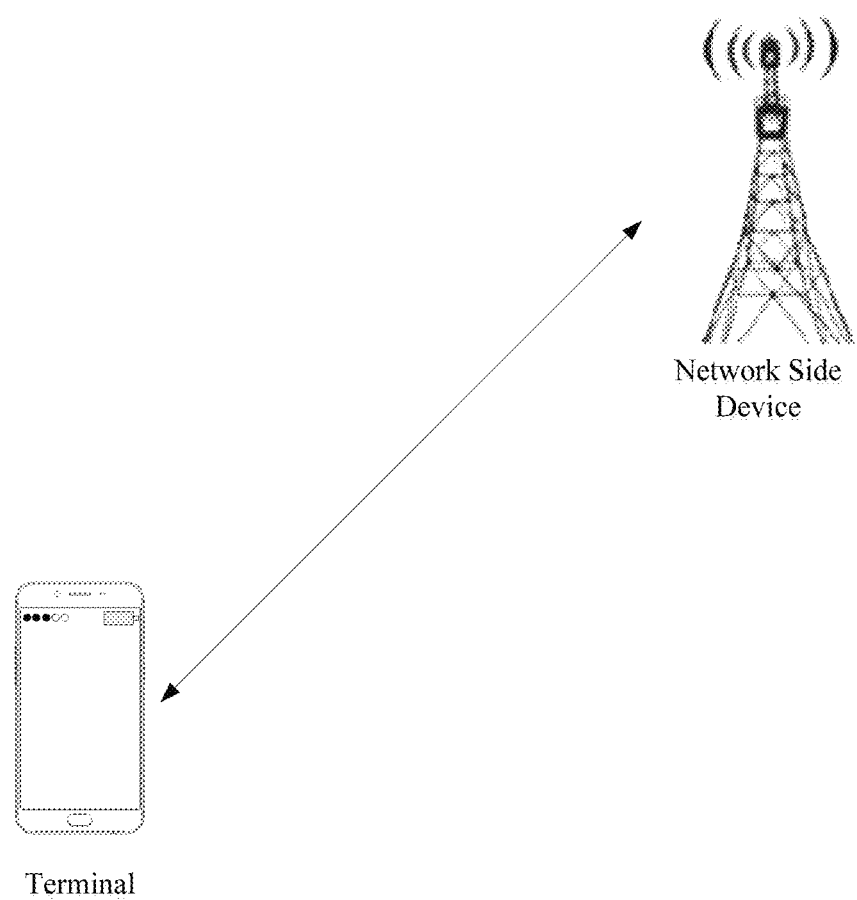
FIG. 1 is a possible network architecture diagram of a communication system provided by an embodiment of the present disclosure.

FIG. 1 illustrates a possible network architecture of an exemplary communication system provided by an embodiment of the present disclosure. Referring to FIG. 1, the exemplary communication system may be, for example, a Global System for Mobile Communications (GSM), a Code Division Multiple Access (CDMA) System, a Time Division Multiple Access (TDMA) System, a Wideband Code Division Multiple Access Wireless (WCDMA) System, a Frequency Division Multiple Addressing (FDMA) System, an Orthogonal Frequency-Division Multiple Access (OFDMA) System, a Single Carrier FDMA (SC-FDMA) System, a General Packet Radio Service (GPRS) System, a LTE System, a 5G/NR System and other such communication systems. The exemplary communication system specifically includes a network side device and a terminal. When the terminal accesses a mobile communication network provided by the network side device, the terminal and the network side device may be communicatively connected through a wireless link, and the communication connection mode may be a single-connection mode, a double-connection mode or a multi-connection mode. When the single-connection mode is employed as the communication connection mode, the network side device may be a LTE base station or a NR base station (also known as gNB base station). When the double-connection mode (which may be specifically realized by Carrier Aggregation (CA) Technology, or realized by multiple network side device) is employed as the communication connection mode, and the terminal is connected with multiple network side device, the multiple network side device may be a primary base station and a secondary base station, and data backhaul is carried out between the base stations through a backhaul link. The primary base station may be a LTE base station, and the secondary base station may be a LTE base station, or the primary base station may be a NR base station, and the secondary base station may be a LTE base station, or the primary base station may be a NR base station, and the secondary base station may be a NR base station.

In the embodiments of the present disclosure, the terms "network" and "system" are often used interchangeably, and the meanings thereof can be understood by those skilled in the art. The terminals involved in the embodiments of the present disclosure may include various handheld devices, vehicle-mounted devices, wearable devices, computing devices having wireless communication functions or other processing devices connected to wireless modems, as well as various forms of User Equipment (UE), Mobile Station (MS), terminal devices, etc. For convenience of description, the above-mentioned devices are collectively referred to as terminals.

Figure 2A:
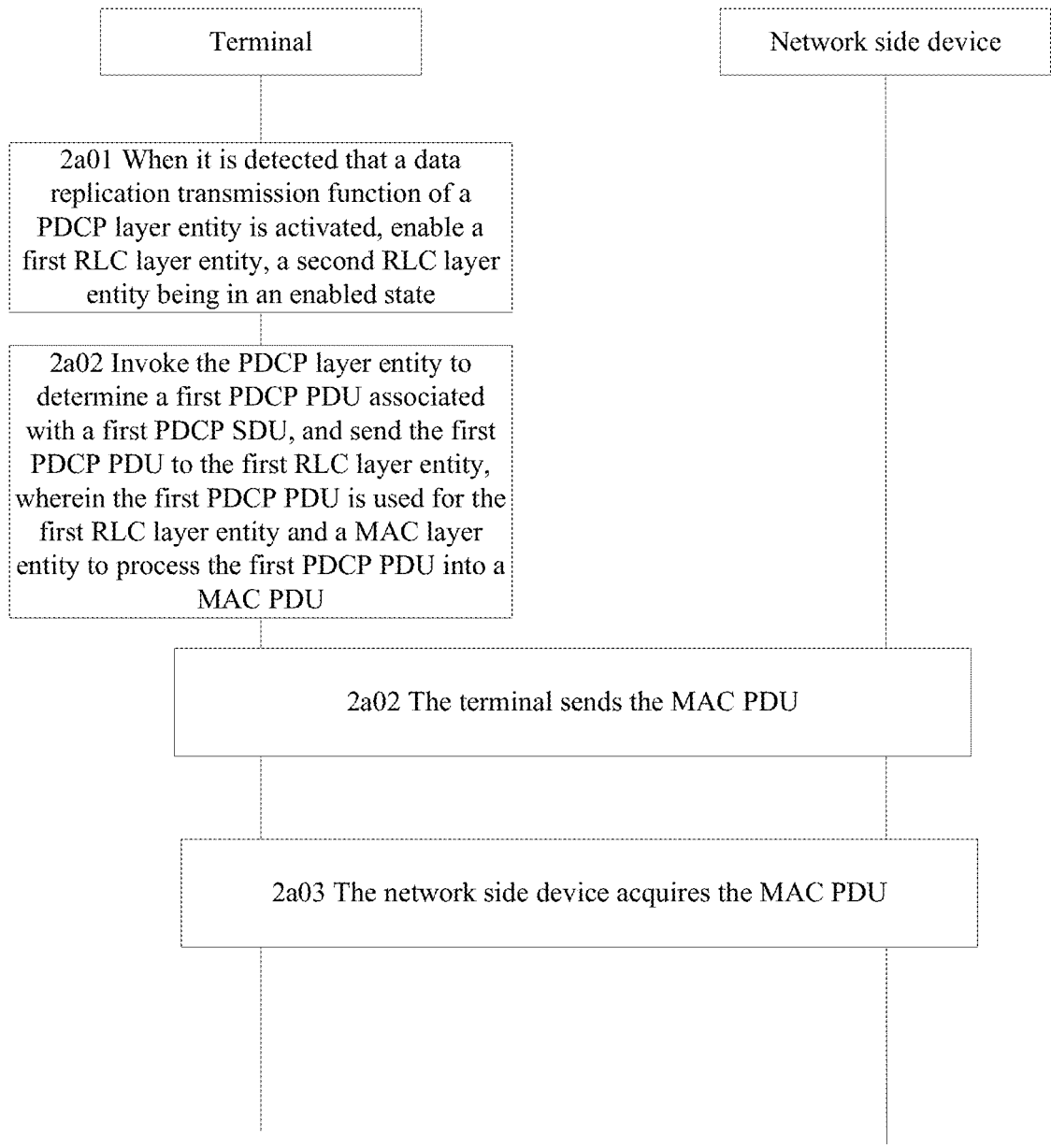
FIG. 2A is a flow chart of a data transmission method provided by an embodiment of the present disclosure.

Referring to FIG. 2A, which illustrates a data transmission method applied to a terminal provided by an embodiment of the present disclosure, the terminal includes a PDCP layer entity, a first RLC layer entity, a second RCL layer entity and a MAC layer entity, and the method includes the following steps.

In 2a01, the terminal enables the first RLC layer entity when detecting that a data duplication transmission function of the PDCP layer entity is activated, where the second RLC layer entity is in an enabled status.

When the data duplication transmission function of the PDCP layer entity is activated or deactivated, the second RLC layer entity is always in the enabled status.

When the data duplication transmission function of the PDCP layer entity is activated, the first RLC layer entity is enabled; and when the data duplication transmission function of the PDCP layer entity is deactivated, the first RLC layer entity is disabled.

Figure 2B:
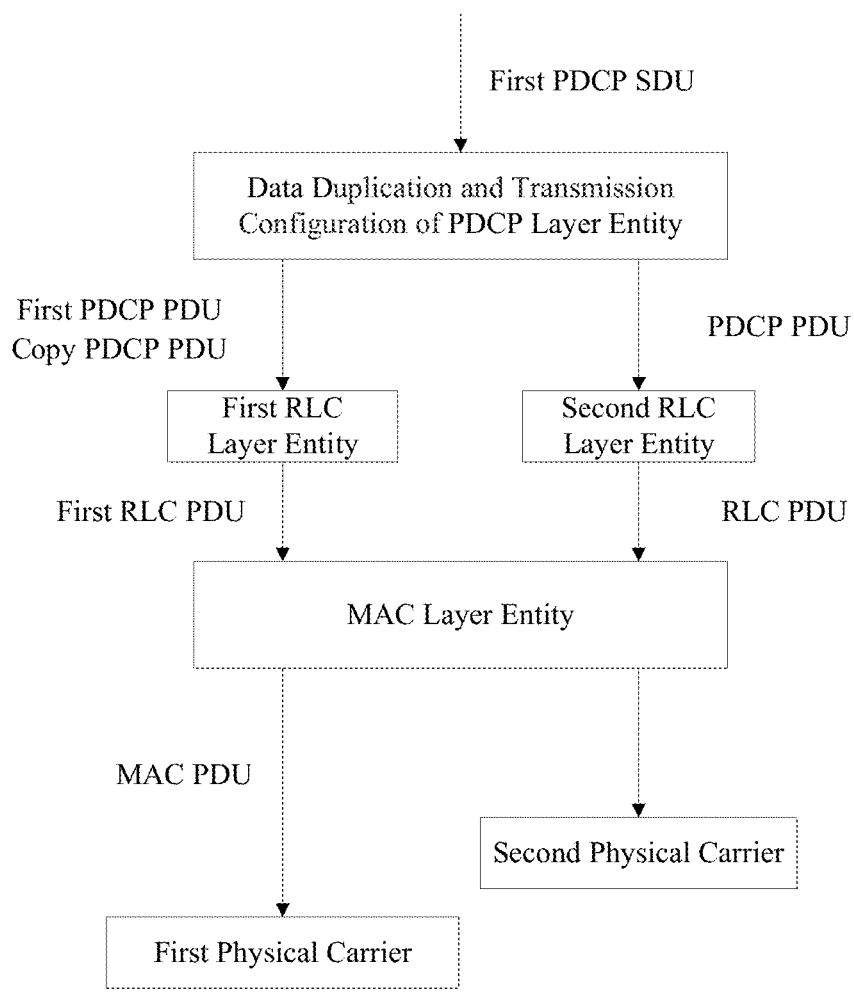
FIG. 2B is a schematic structure diagram of a data transmission protocol provided by the embodiment of the present disclosure.

The data duplication transmission function of the PDCP layer entity is as shown in FIG. 2B. When the data dupli-cation transmission function of the PDCP layer entity is deactivated, and the PDCP layer entity receives the first PDCP SDU, the first PDCP SDU is encapsulated and processed into a PDCP PDU and transmitted to the second RLC layer entity, and then the second RLC layer entity encapsulates and processes the PDCP PDU into a RLC PDU and transmits the RLC PDU to the MAC layer entity. When the data duplication transmission function of the PDCP layer entity is activated, the PDCP layer entity will encapsulate and process the first PDCP SDU into two identical PDCP PDUs, i.e., a PDCP PDU and a PDCP PDU copy (i.e., first PDU), and then the PDCP layer entity transmits the PDCP PDU and the first PDCP PDU respectively to the first RLC layer entity and the second RLC layer entity.

The SDU passing through each layer entity in the data transmission process corresponds to the PDU sent by an upper layer entity, and the PDU of each layer entity corresponds to the SDU of a lower layer entity.

In 2a02, the terminal invokes the PDCP layer entity to determine a first PDCP PDU associated with a first PDCP SDU, and sends the first PDCP PDU to the first RLC layer entity, where the first PDCP PDU is configured for the first RLC layer entity and the MAC layer entity to process the first PDCP PDU into a MAC PDU and send the MAC PDU.

The first PDCP SDU is the PDCP SDU corresponding to the RLC SDU currently transmitted by the second RLC layer entity.

The first PDCP PDU is configured for the first RLC layer entity to encapsulate the first PDCP PDU into a first RLC PDU and send the first RLC PDU to the MAC layer entity, and the first RLC PDU is configured for the MAC layer entity to encapsulate the first RLC PDU into the MAC PDU and send the MAC PDU.

The sending the MAC PDU specifically includes the following steps: as shown in FIG. 2B, the terminal invokes the MAC layer entity to send the MAC PDU to a physical layer PHY layer entity through a first physical carrier, and a PHY PDU is obtained from the MAC PDU through processing operations such as compression and encapsulation of the PHY layer entity, and is sent to the network side device by the PHY layer entity.

The terminal may invoke the PDCP layer entity to process and encapsulate the first PDCP SDU into a plurality of PDCP PDUs, where the currently transmitted PDCP PDU is the first PDCP PDU of the plurality of PDCP PDUs associated with the first PDCP SDU.

When the terminal detects that the data duplication transmission function of the PDCP layer entity is activated from an deactivated status, the RLC PDU currently transmitted by the second RLC layer entity needs to be repeatedly transmitted in the first RLC layer entity, so the PDCP layer entity needs to determine the first PDCP PDU associated with the first PDCP SDU and send the first PDCP PDU to the first RLC layer entity for transmission, where the first PDCP SDU is the PDCP SDU corresponding to the RLC SDU currently transmitted by the second RLC layer entity.

In 2a03, the network side device acquires the MAC PDU.

The acquiring the MAC PDU by the network side device specifically includes the following steps: the network side device receives the PHY PDU from the terminal, and obtains the MAC PDU through processing operations such as demodulation and decapsulation by the PHY layer entity.

It can be seen that in the embodiments of the present disclosure, the terminal, firstly, enables the first RLC layer entity when detecting that the data duplication transmission function of the PDCP layer entity is activated, where the second RLC layer entity is in an enabled status; and secondly, invokes the PDCP layer entity to determine the first PDCP PDU associated with the first PDCP SDU, and sends the first PDCP PDU to the first RLC layer entity, where the first PDCP PDU is configured for the first RLC layer entity and the MAC layer entity to process the first PDCP PDU into the MAC PDU and send the MAC PDU. It can be seen that when the data duplication transmission function of the PDCP layer entity is activated, the first PDCP PDU associated with the first PDCP SDU that needs to be duplicated and transmitted is determined by the PDCP layer entity and sent to the first RLC layer entity. When the second RLC layer entity transmits the data packet, the same data packet of the first RLC layer entity is transmitted, thus implementing the duplication and transmission of the first PDCP SDU, and enabling the first PDCP SDU to be transmitted on two logical channels, which is beneficial for implementing the frequency diversity gain of data transmission and improving the reliability of data transmission.

In one possible example, the invoking the PDCP layer entity to determine the first PDCP PDU associated with the first PDCP SDU includes:

when detecting that the PDCP layer entity satisfies a preset condition, invoking the PDCP layer entity to determine a pre-stored PDCP PDU copy as the first PDCP PDU associated with the first PDCP SDU.

The preset condition includes at least one of the followings: a timeout timer (Discard Timer) in the PDCP layer entity does not time out, a state report (Status Report) of the PDCP layer entity does not indicate to discard the first PDCP PDU, and the PDCP layer entity does not receive an indication of discarding the first PDCP PDU sent by the second RLC layer entity.

When the data duplication transmission function of the PDCP layer entity is deactivated, and the PDCP layer entity receives the first PDCP SDU, although only the first PDCP SDU is encapsulated into one PDCP PDU and transmitted to the second RLC layer entity, the PDCP layer entity may reserve one copy of the PDCP PDU. i.e., the first PDCP PDU, in the PDCP layer entity; therefore, when the data duplication transmission function of the PDCP layer entity is activated, the terminal may determine that the pre-stored PDCP PDU copy in the PDCP layer entity as the first PDCP PDU.

The PDCP PDU copy, i.e., the first PDCP PDU, will be discarded if the preset condition is not satisfied.

It can be seen that in this example, when the data duplication transmission function of the PDCP layer entity is deactivated (in a closed status), the terminal reserves the PDCP PDU copy, i.e., the first PDCP PDU, in the PDCP layer entity. When the data duplication transmission function of the PDCP layer entity is activated, the terminal directly acquires the copy in the PDCP layer entity without a duplication operation again, which is beneficial for improving the data transmission speed of the terminal.

In one possible example, after the enabling the first RLC layer entity when detecting that the data duplication transmission function of the PDCP layer entity is activated, the method further includes:

when detecting that the PDCP layer entity receives a second PDCP SDU, invoking the PDCP layer entity to encapsulate the second PDCP SDU into a second PDCP PDU; and invoking the PDCP layer entity to send the second PDCP PDU to the first RLC layer entity and the second RLC layer entity.

The second PDCP SDU is a data packet different from the first PDCP SDU and newly received by the PDCP layer entity.

Since the data duplication transmission function of the PDCP layer entity is activated, the PDCP layer entity will encapsulate the PDCP SDU into two identical second PDCP PDUs and send the PDCP PDUs to the first RLC layer entity and the second RLC layer entity respectively.

In this possible example, after sending the second PDCP PDUs to the first RLC layer entity and the second RLC layer entity, the method further includes:

when detecting that the data duplication transmission function of the PDCP layer entity is deactivated, invoking the PDCP layer entity to send a preset indication to the first RLC layer entity; and invoking the first RLC layer entity to receive the preset indication, and discarding a second RLC SDU in the first RLC layer entity corresponding to the second PDCP PDU according to the preset indication, where the second RLC SDU is not encapsulated and processed into a second RLC PDU by the first RLC layer entity.

The preset indication is configured to indicate the first RLC layer entity to discard the second RLC SDU corresponding to the second PDCP PDU.

When the data duplication transmission function of the PDCP layer entity is deactivated, the second PDCP PDU only needs to be transmitted in the second RLC layer entity; therefore, the terminal invokes the second RLC layer entity to send the RLC PDU in the second RLC layer entity corresponding to the second PDCP PDU to the MAC layer entity, and interrupts the processing and transmission operations corresponding to the RLC SDU in the first RLC layer entity.

If the second RLC SDU has been encapsulated and processed into the second RLC PDU when the data duplication transmission function of the PDCP layer entity is deactivated, a deletion operation will not be performed, and when the data duplication transmission function of the PDCP layer entity is activated, the second RLC PDU will be continuously transmitted.

It can be seen that in the example, when the data duplication transmission function of the PDCP layer entity is deactivated, the terminal discards the second RLC SDU in the first RLC layer entity that is no longer processed for transmission and is not encapsulated and processed into the second RLC PDU, thus avoiding redundant data packets that need to be transmitted in the first RLC layer entity, which is beneficial for improving the accuracy of subsequent data transmission of the terminal.

The embodiments of the present disclosure are explained in detail with reference to the specific application scenarios hereinafter.

Figure 2C:
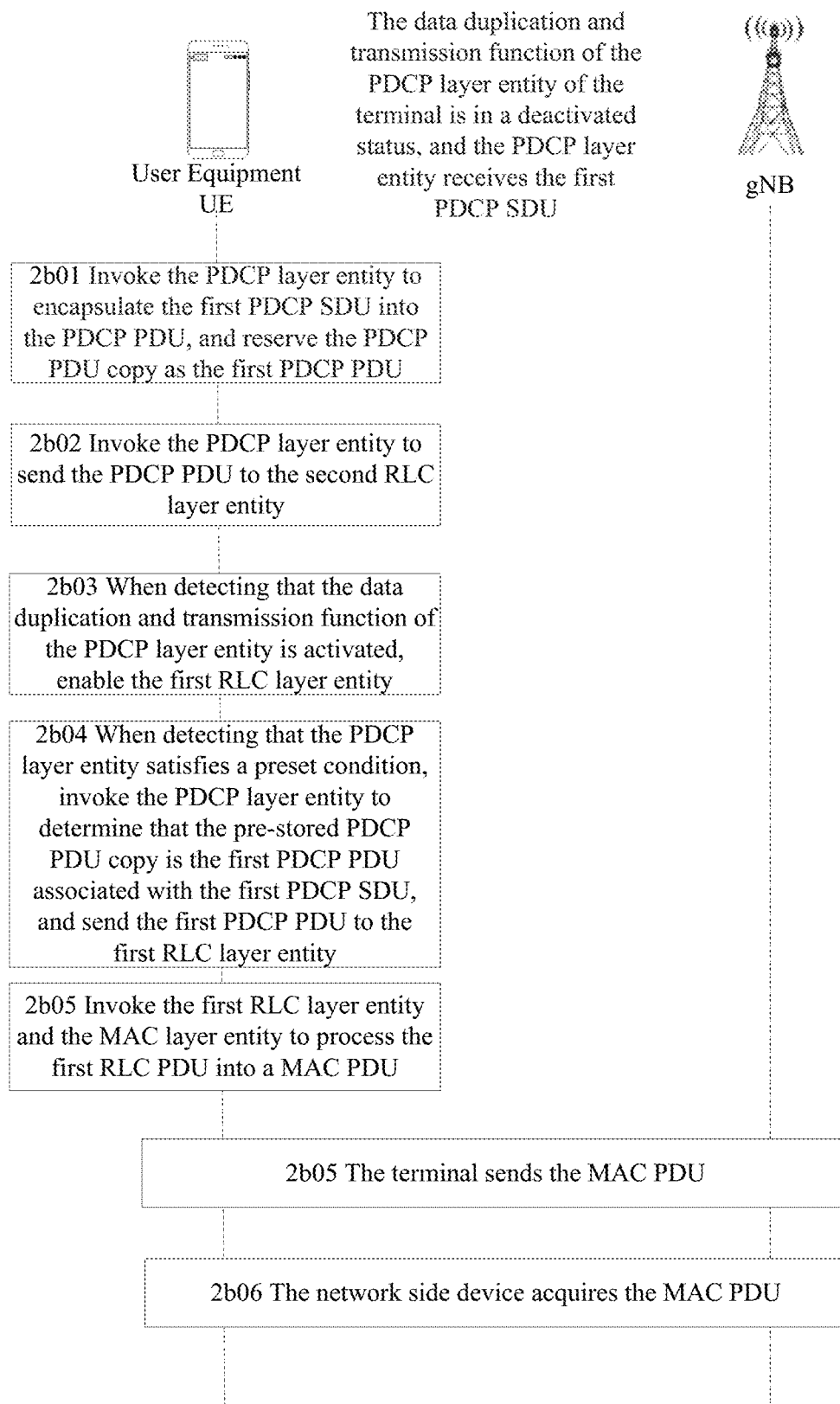
FIG. 2C is a flow chart of the data transmission method in a 5G NR system scenario provided by the embodiment of the present disclosure.

Consistent with the above embodiment shown in FIG. 2A, referring to FIG. 2C, which illustrates another data transmission method provided by an embodiment of the present disclosure, a 5G/NR communication system is employed as the communication system, a base station gNB in the 5G/NR is employed as the network side device, and a user equipment UE in the 5G/NR is employed as the terminal. The data duplication transmission function of the PDCP layer entity is in a deactivated status, the first RLC layer entity is in a disabled status, and the second RLC layer entity is in an enabled status. When the PDCP layer entity receives the first PDCP SDU, the following steps are performed.

In 2*b*01, the terminal invokes the PDCP layer entity to encapsulate the first PDCP SDU into the PDCP PDU, and reserves the PDCP PDU copy as the first PDCP PDU.

In 2b02, the terminal invokes the PDCP layer entity to send the PDCP PDU to the second RLC layer entity.

In 2b03, when detecting that the data duplication transmission function of the PDCP layer entity is activated, the terminal enables the first RLC layer entity.

In 2b04, when detecting that the PDCP layer entity satisfies a preset condition, the terminal invokes the PDCP layer entity to determine that the pre-stored PDCP PDU copy is the first PDCP PDU associated with the first PDCP SDU, and sends the first PDCP PDU to the first RLC layer entity.

The preset condition includes at least one of the followings: a Discard Timer in the PDCP layer entity does not time out, a Status Report of the PDCP layer entity does not indicate to discard the first PDCP PDU, and the PDCP layer entity does not receive an indication of discarding the first PDCP PDU sent by the second RLC layer entity.

In 2b05, the terminal invokes the first RLC layer entity and the MAC layer entity to process the first PDCP PDU into a MAC PDU and send the MAC PDU.

In 2b06, the network side device acquires the MAC PDU.

It can be seen that in the embodiments of the present disclosure, the terminal, firstly, enables the first RLC layer entity when detecting that the data duplication transmission function of the PDCP layer entity is activated, where the second RLC layer entity is in an enabled status; and secondly, invokes the PDCP layer entity to determine the first PDCP PDU associated with the first PDCP SDU, and sends the first PDCP PDU to the first RLC layer entity, where the first PDCP PDU is configured for the first RLC layer entity and the MAC layer entity to process the first PDCP PDU into the MAC PDU and send the MAC PDU. It can be seen that when the data duplication transmission function of the PDCP layer entity is activated, the first PDCP PDU associated with the first PDCP SDU that needs to be duplicated and transmitted is determined by the PDCP layer entity and sent to the first RLC layer entity. When the second RLC layer entity transmits the data packet, the same data packet of the first RLC layer entity is transmitted, thus implementing the duplication and transmission of the first PDCP SDU, and enabling the first PDCP SDU to be transmitted on two logical channels, which is beneficial for implementing the frequency diversity gain of data transmission and improving the reliability of data transmission.

Moreover, when the data duplication transmission function of the PDCP layer entity is in a deactivated status, the terminal reserves the PDCP PDU copy, i.e., the first PDCP PDU, in the PDCP layer entity. When the data duplication transmission function of the PDCP layer entity is activated, the terminal directly acquires the copy in the PDCP layer entity without a duplication operation again, which is beneficial for improving the data transmission speed of the terminal.

Figure 2D:
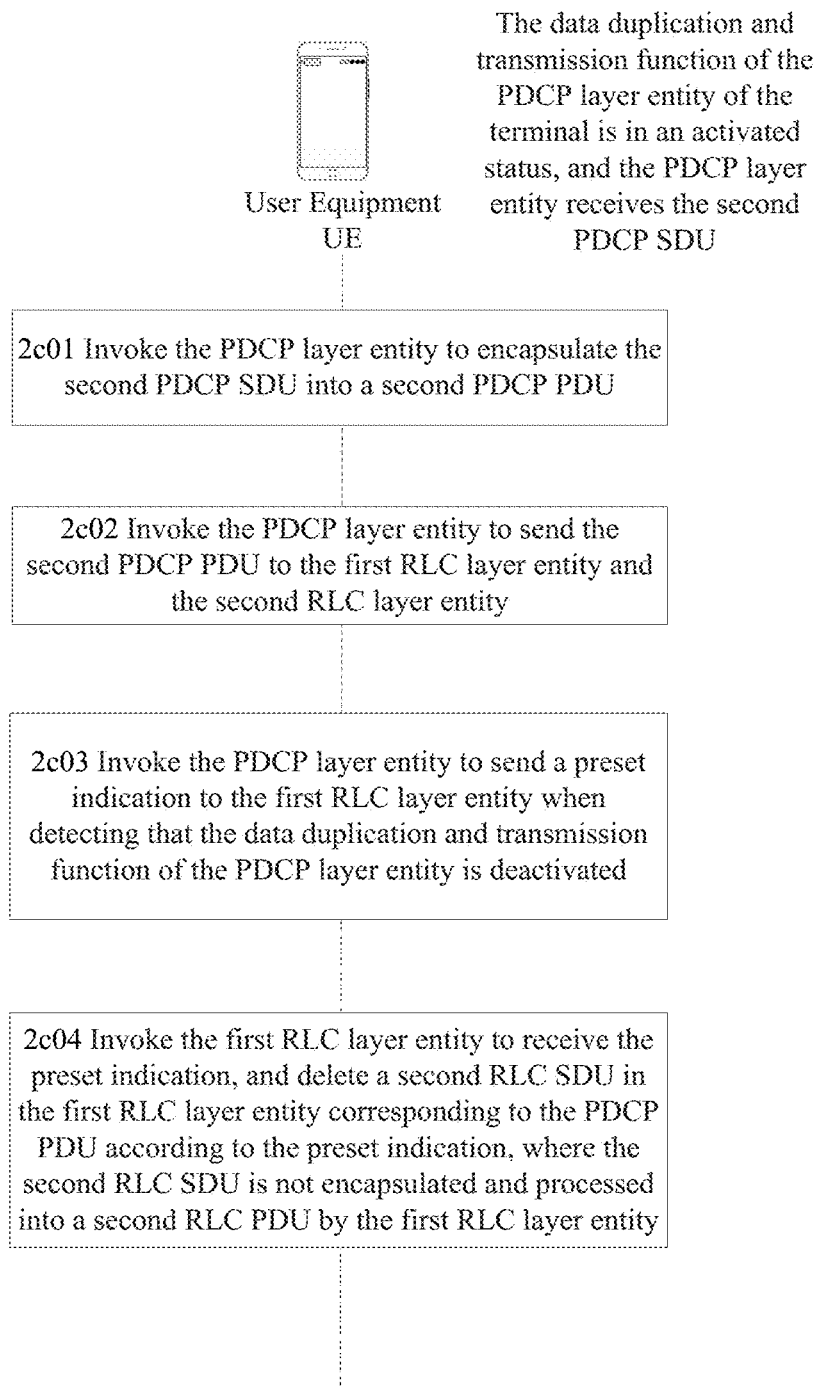
FIG. 2D is a flow chart of the data transmission method in the 5G NR system scenario provided by the embodiment of the present disclosure.

Consistent with the above embodiment shown in FIG. 2A, referring to FIG. 2D, which illustrates another data transmission method provided by an embodiment of the present disclosure, a 5G/NR communication system is employed as the communication system, a base station gNB in the 5G/NR is employed as the network side device, and a user equipment UE in the 5G/NR is employed as the terminal. The data duplication transmission function of the PDCP layer entity is in an activated status, the first RLC layer entity is in an enabled status, and the second RLC layer entity is in an enabled status. When the PDCP layer entity receives the second PDCP SDU, the following steps are performed.

In 2c01, the terminal invokes the PDCP layer entity to encapsulate the second PDCP SDU into a second PDCP PDU.

In 2c02, the terminal invokes the PDCP layer entity to send the second PDCP PDU to the first RLC layer entity and the second RLC layer entity.

In 2c03, the terminal invokes the PDCP layer entity to send a preset indication to the first RLC layer entity when detecting that the data duplication transmission function of the PDCP layer entity is deactivated.

In 2c04, the terminal invokes the first RLC layer entity to receive the preset indication, and discards a second RLC SDU in the first RLC layer entity corresponding to the PDCP PDU according to the preset indication, where the second RLC SDU is not encapsulated and processed into a second RLC PDU by the first RLC layer entity.

It can be seen that in the embodiments of the present disclosure, when the data duplication transmission function of the PDCP layer entity is deactivated, the terminal discards the second RLC SDU in the first RLC layer entity that is no longer processed for transmission and is not encapsulated and processed into the second RLC PDU, thus avoiding redundant data packets that need to be transmitted in the first RLC layer entity, which is beneficial for improving the accuracy of subsequent data transmission of the terminal.

Figure 3:
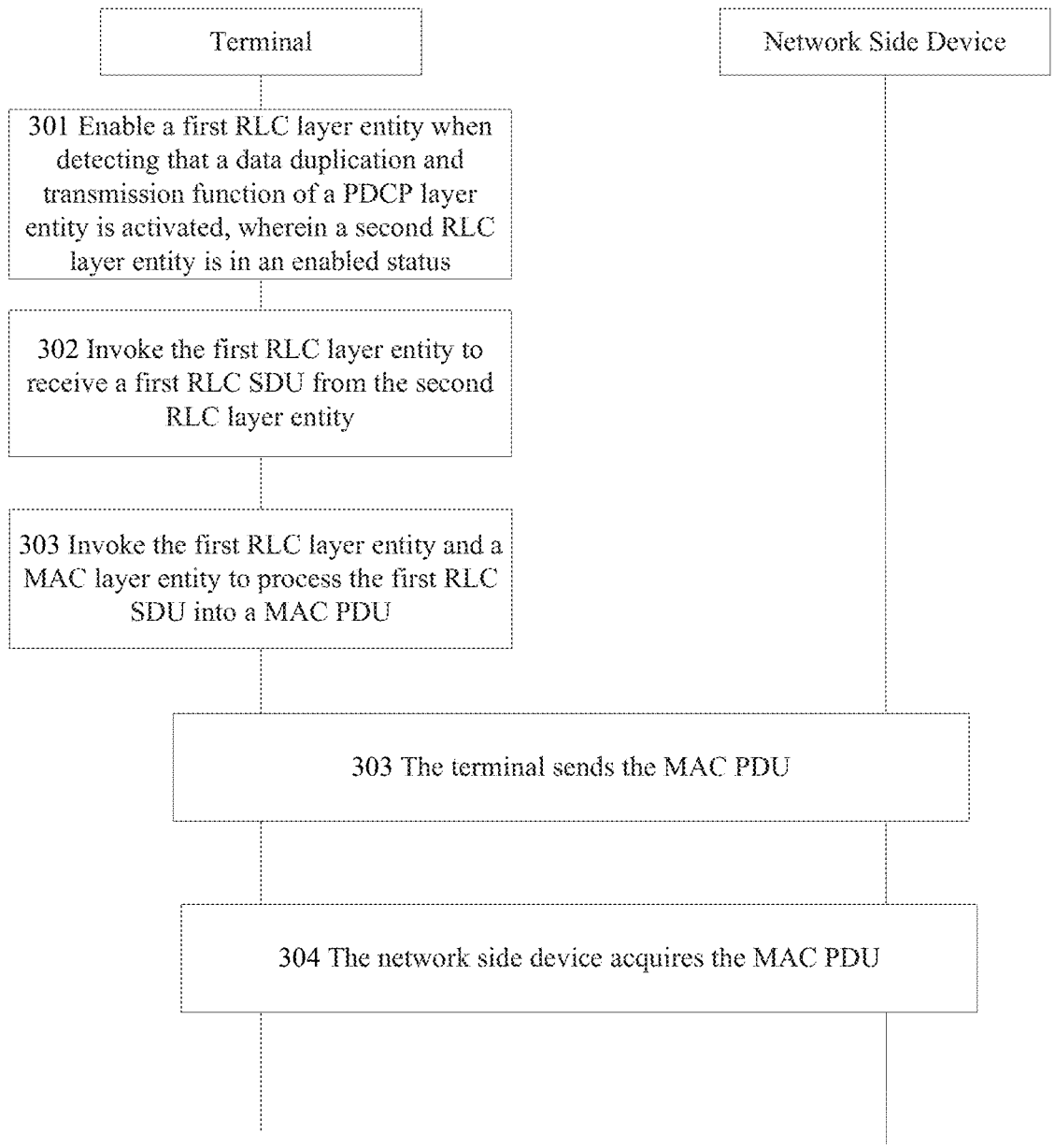
FIG. 3 is a flow chart of a data transmission method provided by an embodiment of the present disclosure.

Referring to FIG. 3, which illustrates a data transmission method applied to a terminal provided by an embodiment of the present disclosure, the terminal includes a PDCP layer entity, a first RLC layer entity, a second RCL layer entity and a MAC layer entity, and the method includes the following steps.

In 301, the terminal enables the first RLC layer entity when detecting that a data duplication transmission function of the PDCP layer entity is activated, where the second RLC layer entity is in an enabled status.

In 302, the terminal invokes the first RLC layer entity to receive a first RLC SDU from the second RLC layer entity.

The first RLC SDU is the RLC SDU identical to the RLC SDU currently transmitted by the second RLC layer entity.

When it is detected that the data duplication transmission function of the PDCP layer entity is activated, since the first RLC layer entity needs to duplicate and transmit the RLC PDU currently transmitted by the second RLC layer entity, the terminal may invoke the first RLC layer entity to acquire the RLC SDU in a buffer of the second RLC layer entity as the first RLC SDU; in this case, before the data duplication transmission function of the PDCP layer entity is activated, the PDCP layer entity does not reserve the PDCP PDU copy corresponding to the RLC SDU currently transmitted by the second RLC layer entity.

In 303, the terminal invokes the first RLC layer entity and the MAC layer entity to process the first RLC SDU into a MAC PDU and send the MAC PDU.

In one possible example, the invoking the first RLC layer entity and the MAC layer entity to process the first RLC SDU into the MAC PDU and send the MAC PDU includes:

invoking the first RLC layer entity to encapsulate the first RLC SDU into a first RLC PDU and send the first RLC PDU to the MAC layer entity; and invoking the MAC layer entity to encapsulate the first RLC PDU into the MAC PDU and send the MAC PDU.

The sending the MAC PDU specifically includes the following steps: as shown in FIG. 2B, the terminal invokes the MAC layer entity to send the MAC PDU to a physical layer PHY layer entity through a first physical carrier, and a PHY PDU is obtained from the MAC PDU through processing operations such as compression and encapsulation of the PHY layer entity, and is sent to the network side device by the PHY layer entity.

In 304, the network side device acquires the MAC PDU.

The above 301 and 304 may refer to the corresponding steps in the embodiment described in FIG. 2A It can be seen that in the embodiments of the present disclosure, the terminal, firstly, enables the first RLC layer entity when detecting that the data duplication transmission function of the PDCP layer entity is activated; secondly, invokes the first RLC layer entity to receive the first RLC SDU from the second RLC layer entity; and finally, invokes the first RLC layer entity and the MAC layer entity to process the first RLC SDU into the MAC PDU and send the MAC PDU. It can be seen that when the data duplication transmission function of the PDCP layer entity is activated, the first RLC SDU of the second RLC layer entity that needs to be duplicated and transmitted is determined by the first RLC layer entity. When the second RLC layer entity transmits the data packet, the same data packet of the first RLC layer entity is transmitted, thus implementing the data duplication and transmission, and enabling the data to be transmitted on two logical channels, which is beneficial for implementing the frequency diversity gain of data transmission and improving the reliability of data transmission.

In one possible example, after enabling the first RLC layer entity when detecting that the data duplication transmission function of the PDCP layer entity is activated, the method further includes:

when detecting that the PDCP layer entity receives a PDCP SDU, invoking the PDCP layer entity to encapsulate the PDCP SDU into a PDCP PDU; and invoking the PDCP layer entity to send the PDCP PDU to the first RLC layer entity and the second RLC layer entity.

The PDCP SDU is a data packet irrelevant with the above MAC PDU and newly received by the PDCP layer entity.

Since the data duplication transmission function of the PDCP layer entity is activated, the PDCP layer entity will encapsulate the PDCP SDU into two identical PDCP PDUs and send the PDCP PDUs to the first RLC layer entity and the second RLC layer entity respectively.

In one possible example, after sending the PDCP PDU to the first RLC laver entity and the second RLC layer entity, the method further includes:

when detecting that the data duplication transmission function of the PDCP layer entity is deactivated, invoking the PDCP layer entity to send a preset indication to the first RLC layer entity; and invoking the first RLC layer entity to receive the preset indication, and discarding a second RLC SDU in the first RLC layer entity corresponding to the PDCP PDU according to the preset indication, where the second RLC SDU is not encapsulated and processed into a second RLC PDU by the first RLC layer entity.

The preset indication is configured to indicate the first RLC layer entity to discard the second RLC SDU corresponding to the PDCP PDU.

When the data duplication transmission function of the PDCP layer entity is deactivated, the PDCP PDU only needs to be transmitted in the second RLC layer entity; therefore, the terminal invokes the second RLC layer entity to send the RLC PDU in the second RLC layer entity corresponding to the PDCP PDU to the MAC layer entity, and interrupts the processing and transmission operations corresponding to the second RLC SDU in the first RLC layer entity.

If the second RLC SDU has been encapsulated and processed into the second RLC PDU when the data duplication transmission function of the PDCP layer entity is deactivated, a deletion operation will not be performed, and when the data duplication transmission function of the PDCP layer entity is activated, the second RLC PDU will be continuously transmitted.

It can be seen that in the example, when the data duplication transmission function of the PDCP layer entity is deactivated, the terminal discards the second RLC SDU in the first RLC layer entity that is no longer processed for transmission and is not encapsulated and processed into the second RLC PDU, thus avoiding redundant data packets that need to be transmitted in the first RLC layer entity, which is beneficial for improving the accuracy of subsequent data transmission of the terminal.

Figure 4A:
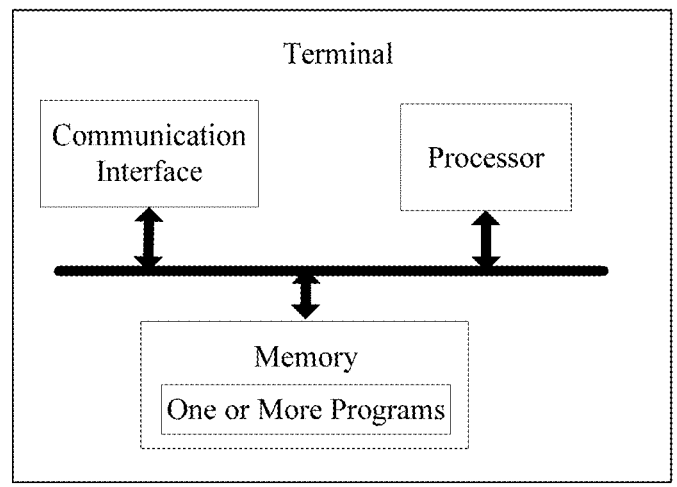
FIG. 4A is a schematic structure diagram of a terminal provided by an embodiment of the present disclosure.

Consistent with the above embodiment shown in FIG. 2A, referring to FIG. 4A, which is a schematic structure diagram of a terminal provided by an embodiment of the present disclosure, the terminal includes a processor, a memory, a communication interface, and one or more programs stored in the memory and configured to be executed by the processor, where the programs include instructions for performing the following steps:

when detecting that a data duplication transmission function of the PDCP layer entity is activated, enabling the first RLC layer entity, where the second RLC layer entity is in an enabled status; and invoking the PDCP layer entity to determine a first PDCP PDU associated with a first PDCP SDU, and sending the first PDCP PDU to the first RLC layer entity, where the first PDCP PDU is configured for the first RLC layer entity and the MAC layer entity to process the first PDCP PDU into a MAC PDU and send the MAC PDU.

It can be seen that in the embodiments of the present disclosure, the terminal, firstly, enables the first RLC layer entity when detecting that the data duplication transmission function of the PDCP layer entity is activated, where the second RLC layer entity is in an enabled status; and secondly, invokes the PDCP layer entity to determine the first PDCP PDU associated with the first PDCP SDU, and sends the first PDCP PDU to the first RLC layer entity, where the first PDCP PDU is configured for the first RLC layer entity and the MAC layer entity to process the first PDCP PDU into the MAC PDU and send the MAC PDU. It can be seen that when the data duplication transmission function of the PDCP layer entity is activated, the first PDCP PDU associated with the first PDCP SDU that needs to be duplicated and transmitted is determined by the PDCP layer entity and sent to the first RLC layer entity. When the second RLC layer entity transmits the data packet, the same data packet of the first RLC layer entity is transmitted, thus implementing the duplication and transmission of the first PDCP SDU, and enabling the first PDCP SDU to be transmitted on two logical channels, which is beneficial for implementing the frequency diversity gain of data transmission and improving the reliability of data transmission.

In one possible example, in the aspect of invoking the PDCP layer entity to determine the first PDCP PDU associated with the first PDCP SDU, the instructions in the above program are specifically configured to perform the following steps: when detecting that the PDCP layer entity satisfies a preset condition, invoking the PDCP layer entity to determine a pre-stored PDCP PDU copy as the first PDCP PDU associated with the first PDCP SDU.

In this possible example, the preset condition includes at least one of the followings: a Discard Timer in the PDCP layer entity does not time out, a Status Report of the PDCP layer entity does not indicate to discard the first PDCP PDU, and the PDCP layer entity does not receive an indication of discarding the first PDCP PDU sent by the second RLC layer entity.

In one possible example, the first PDCP PDU is configured for the first RLC layer entity to encapsulate the first PDCP PDU into a first RLC PDU and send the first RLC PDU to the MAC layer entity, and the MAC layer entity encapsulates the first RLC PDU into the MAC PDU and sends the MAC PDU.

In one possible example, the program further includes instructions for performing the following steps: after enabling the first RLC layer entity when detecting that the data duplication transmission function of the PDCP layer entity is activated, when detecting that the PDCP layer entity receives a second PDCP SDU, invoking the PDCP layer entity to encapsulate the second PDCP SDU into a second PDCP PDU; and invoking the PDCP layer entity to send the second PDCP PDU to the first RLC layer entity and the second RLC layer entity.

In this possible example, the program further includes instructions for performing the following steps: after sending the second PDCP PDU to the first RLC layer entity and the second RLC layer entity, w % ben detecting that the data duplication transmission function of the PDCP layer entity is deactivated, invoking the PDCP layer entity to send a preset indication to the first RLC layer entity; and invoking the first RLC layer entity to receive the preset indication, and discarding a second RLC SDU in the first RLC layer entity corresponding to the second PDCP PDU according to the preset indication, where the second RLC SDU is not encapsulated and processed into a second RLC PDU by the first RLC layer entity.

Figure 4B:
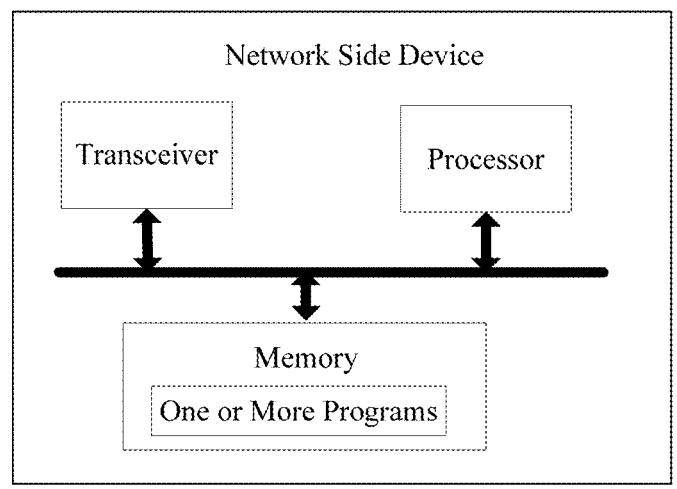
FIG. 4B is a schematic structure diagram of a network side device provided by the embodiment of the present disclosure.

Consistent with the above embodiment shown in FIG. 2A, referring to FIG. 4B, which is a schematic structure diagram of a network side device provided by an embodiment of the present disclosure, the network side device includes a processor, a memory, a transceiver, and one or more programs stored in the memory and configured to be executed by the processor, where the programs include instructions for performing the following steps.

The network side device acquires a MAC PDU of a terminal, where the MAC PDU is obtained through processing a first PDCP PDU by a first RLC layer entity and a MAC layer entity, the first PDCP PDU is the first PDCP PDU associated with a first PDCP SDU and determined by the terminal through enabling the first RLC layer entity and invoking a PDCP layer entity when detecting that a data duplication transmission function of the PDCP layer entity is activated, and the first PDCP PDU is sent to the first RLC layer entity, a second RLC layer entity being in an enabled status.

It can be seen that in the embodiments of the present disclosure, the network side device acquires the MAC PDU of the terminal, and the MAC PDU is obtained through the transmission of the first PDCP PDU. When the data duplication transmission function of the PDCP layer entity is activated, the first PDCP PDU associated with the first PDCP SDU is determined by the PDCP layer entity and sent to the first RLC layer entity. When the second RLC layer entity transmits the data packet, the same data packet of the first RLC layer entity is transmitted, thus implementing the duplication and transmission of the first PDCP SDU, and enabling the first PDCP SDU to be transmitted on two logical channels, which is beneficial for implementing the frequency diversity gain of data transmission and improving the reliability of data transmission.

Figure 5A:
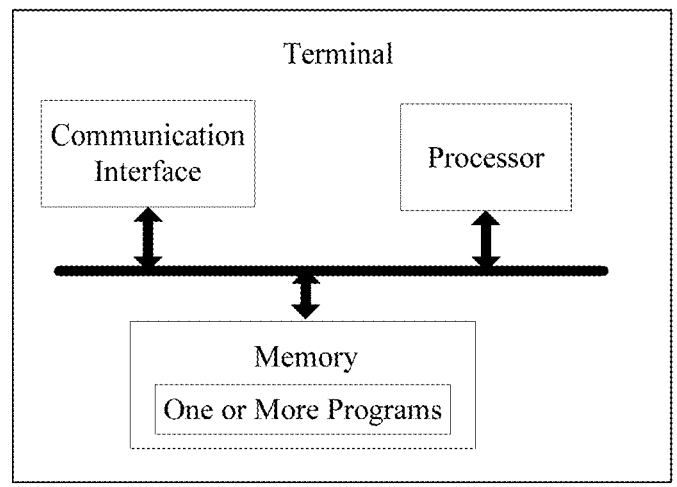
FIG. 5A is a schematic structure diagram of a terminal provided by an embodiment of the present disclosure.

Consistent with the above embodiment shown in FIG. 3, referring to FIG. 5A, which is a schematic structure diagram of a terminal provided by an embodiment of the present disclosure, the terminal includes a processor, a memory, a communication interface, and one or more programs stored in the memory and configured to be executed by the processor, where the programs include instructions for performing the following steps:

when detecting that a data duplication transmission function of the PDCP layer entity is activated, enabling the first RLC layer entity, where the second RLC layer entity is in an enabled status;

invoking the first RLC layer entity to receive a first RLC SDU from the second RLC layer entity; and invoking the first RLC layer entity and the MAC layer entity to process the first RLC SDU into a MAC PDU and send the MAC PDU.

It can be seen that in the embodiments of the present disclosure, the terminal, firstly, enables the first RLC layer entity when detecting that the data duplication transmission function of the PDCP layer entity is activated; secondly, invokes the first RLC layer entity to receive the first RLC SDU from the second RLC layer entity; and finally, invokes the first RLC layer entity and the MAC layer entity to process the first RLC SDU into the MAC PDU and send the MAC PDU. It can be seen that when the data duplication transmission function of the PDCP layer entity is activated, the first RLC SDU of the second RLC layer entity that needs to be duplicated and transmitted is determined by the first RLC layer entity. When the second RLC layer entity transmits the data packet, the same data packet of the first RLC layer entity is transmitted, thus implementing the data duplication and transmission, and enabling the data to be transmitted on two logical channels, which is beneficial for implementing the frequency diversity gain of data transmission and improving the reliability of data transmission.

In one possible example, in the aspect of invoking the first RLC layer entity and the MAC layer entity to process the first RLC SDU into the MAC PDU and send the MAC PDU, the instructions in the above program are specifically configured to perform the following steps: invoking the first RLC layer entity to encapsulate the first RLC SDU into a first RLC PDU and send the first RLC PDU to the MAC layer entity; and invoking the MAC layer entity to encapsulate the first RLC PDU into the MAC PDU and send the MAC PDU.

In one possible example, the program further includes instructions for performing the following steps: after enabling the first RLC layer entity when detecting that the data duplication transmission function of the PDCP layer entity is activated, when detecting that the PDCP layer entity receives a PDCP SDU, invoking the PDCP layer entity to encapsulate the PDCP SDU into a PDCP PDU; and invoking the PDCP layer entity to send the PDCP PDU to the first RLC layer entity and the second RLC layer entity.

In this possible example, the program further includes instructions for performing the following steps: after sending the PDCP PDU to the first RLC layer entity and the second RLC layer entity, when detecting that the data duplication transmission function of the PDCP laver entity is deactivated, invoking the PDCP layer entity to send a preset indication to the first RLC layer entity; and invoking the first RLC layer entity to receive the preset indication, and discarding a second RLC SDU in the first RLC laver entity corresponding to the PDCP PDU according to the preset indication, where the second RLC SDU is not encapsulated and processed into a second RLC PDU by the first RLC layer entity.

Figure 5B:
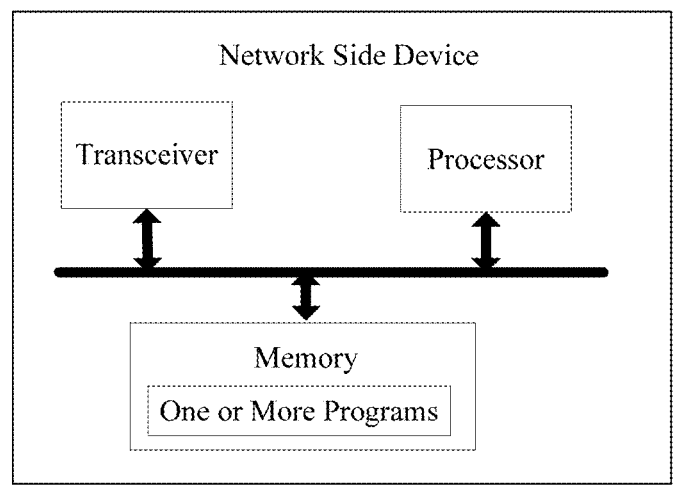
FIG. 5B is a schematic structure diagram of a network side device provided by the embodiment of the present disclosure.

Consistent with the above embodiment shown in FIG. 3, referring to FIG. 5B, which is a schematic structure diagram of a network side device provided by an embodiment of the present disclosure, the network side device includes a processor, a memory, a transceiver, and one or more programs stored in the memory and configured to be executed by the processor, wherein the programs include instructions for performing the following steps:

acquiring, by the network side device, a MAC PDU of a terminal, where the MAC PDU is obtained through processing a first RLC SDU by a first RLC layer entity and a MAC layer entity, the first PDCP PDU is the first PDCP PDU from a second RLC layer entity and received by the terminal through enabling the first RLC layer entity and invoking the first RLC layer entity when detecting that a data duplication transmission function of the PDCP layer entity is activated, the second RLC layer entity being in an enabled status.

It can be seen that in the embodiments of the present disclosure, the network side device acquires the MAC PDU of the terminal, and the MAC PDU is obtained through the transmission of the first RLC SDU. When the data duplication transmission function of the PDCP layer entity is activated, the first RLC layer entity receives the first PDCP SDU from the second RLC layer entity. When the second RLC layer entity transmits the data packet, the same data packet of the first RLC layer entity is transmitted, thus implementing the duplication and transmission of data, and enabling the data to be transmitted on two logical channels, which is beneficial for implementing the frequency diversity gain of data transmission and improving the reliability of data transmission.

The above mainly introduces the solutions of the embodiments of the present disclosure from the perspective of interaction between various network elements. It can be understood that, in order to realize the above-mentioned functions, the terminal and the network side device include corresponding hardware structures and/or software modules for performing various functions. Those skilled in the art may be easily aware that, in combination with the exemplary units and algorithm steps described in the embodiments disclosed herein, the present disclosure may be implemented by hardware or a combination of hardware and computer software. Whether a certain function is executed by hardware or hardware driven by computer software depends on particular applications and design constraint conditions of the technical solutions. Professionals may use different methods to implement the described functions for each particular application, but it should not be deemed that the implementation goes beyond the scope of the present disclosure.

The embodiments of the present disclosure may divide function units for the terminal and the network side device according to the above method examples, for example, each function unit may be divided corresponding to each function, or two or more functions may be integrated into one processing unit. The integrated units above may either be implemented in the form of hardware, or in the form of software program modules. It should be noted that the division of units in the embodiments of the present disclosure is schematic and is only a logical function division, and there may be other division modes in actual implementation.

Figure 6:
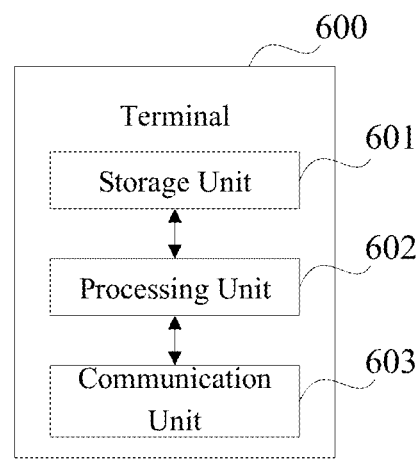
FIG. 6 is a block diagram of a function unit composition of a terminal provided by an embodiment of the present disclosure.

In the case of using the integrated units, FIG. 6 illustrates a block diagram of a possible function unit composition of the terminal involved in the above embodiments. The terminal 60) includes a processing unit 602 and a communication unit 603. The processing unit 602 is used to control and manage actions of the terminal. For example, the processing unit 602 is used to support the terminal to execute steps 2A1-2a02 in FIG. 2A, steps 2b01-2b05 in FIG. 2C, steps 2c01-2c04 in FIG. 2D, steps 301-303 in FIG. 3, and/or other processes for the technologies described herein. The communication unit 603 is used to support communications between the terminal and other devices, such as communications with the network side device shown in FIG. 4B or FIG. 5B. The terminal may further include a storage unit 601 for storing program codes and data of the terminal.

The processing unit 602 may be a processor or a controller, for example, a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware device or any combination thereof. The processing unit may implement or execute various exemplary logical blocks, modules, and circuits described in connection with the present disclosure. The processor may also be a combination that implements computing functions, such as a combination that includes one or more microprocessors, a combination of DSP and microprocessors, and the like. The communication unit 603 may be a communication interface, a transceiver, a transceiver circuit, etc., and the storage unit 601 may be a memory.

The processing unit 602 is configured to, when detecting that a data duplication transmission function of a PDCP layer entity is activated, enable a first RLC layer entity, where a second RLC layer entity is in an enabled status; invoke the PDCP layer entity to determine a first PDCP PDU associated with a first PDCP SDU and send the first PDCP PDU to the first RLC layer entity, and invoke the first RLC layer entity and a MAC layer entity to process the first PDCP PDU into a MAC PDU and send the MAC PDU through the communication unit 603.

In one possible example, in the aspect of invoking the PDCP layer entity to determine the first PDCP PDU associated with the first PDCP SDU, the processing unit 602 is specifically configured to: when detecting that the PDCP layer entity satisfies a preset condition, invoke the PDCP layer entity to determine a pre-stored PDCP PDU copy as the first PDCP PDU associated with the first PDCP SDU.

In this possible example, the preset conditions includes at least one of the followings: a Discard Timer in the PDCP layer entity does not time out, a Status Report of the PDCP layer entity does not indicate to discard the first PDCP PDU, and the PDCP layer entity does not receive an indication of discarding the first PDCP PDU sent by the second RLC layer entity.

In one possible example, the first PDCP PDU is configured for the first RLC layer entity to encapsulate the first PDCP PDU into a first RLC PDU and send the first RLC PDU to the MAC layer entity, and the MAC layer entity encapsulates the first RLC PDU into the MAC PDU and sends the MAC PDU.

In one possible example, the processing unit 602, after enabling the first RLC layer entity when detecting that the data duplication transmission function of the PDCP layer entity is activated, is further configured to: when detecting that the PDCP layer entity receives a second PDCP SDU, invoke the PDCP layer entity to encapsulate the second PDCP SDU into a second PDCP PDU; and invoke the PDCP layer entity to send the second PDCP PDU to the first RLC layer entity and the second RLC layer entity.

In this possible example, the processing unit 602, after sending the second PDCP PDU to the first RLC layer entity and the second RLC layer entity, is further configured to: when detecting that the data duplication transmission function of the PDCP layer entity is deactivated, invoke the PDCP layer entity to send a preset indication to the first RLC layer entity; and invoke the first RLC layer entity to receive the preset indication, and discard a second RLC SDU in the first RLC layer entity corresponding to the second PDCP PDU according to the preset indication, where the second RLC SDU is not encapsulated and processed into a second RLC PDU by the first RLC layer entity.

Or, the processing unit 602 is configured to, when detecting that the data duplication transmission function of the PDCP layer entity is activated, enable the first RLC layer entity, where the second RLC layer entity is in an enabled status; invoke the first RLC layer entity to receive a first RLC SDU from the second RLC layer entity; and invoke the first RLC layer entity and the MAC layer entity to process the first RLC SDU into a MAC PDU and send the MAC PDU through the communication unit 603.

In one possible example, in the aspect of invoking the first RLC layer entity and the MAC layer entity to process the first RLC SDU into the MAC PDU and send the MAC PDU through the communication unit 603, the processing unit 602 is specifically configured to: invoke the first RLC layer entity to encapsulate the first RLC SDU into a first RLC PDU and send the first RLC PDU to the MAC layer entity; and invoke the MAC layer entity to encapsulate the first RLC PDU into the MAC PDU and send the MAC PDU through the communication unit 603.

In one possible example, the processing unit 602, after enabling the first RLC layer entity when detecting that the data duplication transmission function of the PDCP layer entity is activated, is further configured to: when detecting that the PDCP layer entity receives a PDCP SDU, invoke the PDCP layer entity to encapsulate the PDCP SDU into a PDCP PDU; and invoke the PDCP layer entity to send the PDCP PDU to the first RLC layer entity and the second RLC layer entity.

In this possible example, the processing unit 602, after sending the PDCP PDU to the first RLC layer entity and the second RLC layer entity, is further configured to: when detecting that the data duplication transmission function of the PDCP layer entity is deactivated, invoke the PDCP layer entity to send a preset indication to the first RLC layer entity; and invoke the first RLC layer entity to receive the preset indication, and discard a second RLC SDU in the first RLC layer entity corresponding to the PDCP PDU according to the preset indication, where the second RLC SDU is not encapsulated and processed into a second RLC PDU by the first RLC layer entity.

When the processing unit 602 is a processor, the communication unit 603 is a communication interface, and the storage unit 601 is a memory, the terminal according to the embodiments of the present disclosure may be the terminal shown in FIG. 4A or FIG. 5A.

Figure 7:
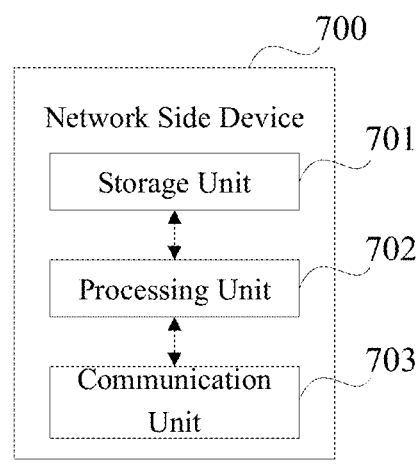
FIG. 7 is a block diagram of a function unit composition of a network side device provided by an embodiment of the present disclosure.

In the case of using the integrated units, FIG. 7 illustrates a block diagram of a possible function unit composition of the network side device involved in the above embodiment. The network side device 700 includes a processing unit 702 and a communication unit 703. The processing unit 702 is used to control and manage actions of the network side device. For example, the processing unit 702 is used to support the network side device to execute step 2a03 in FIG. 2A, step 2b06 in FIG. 2C, step 304 in FIG. 3, and/or other processes for the technologies described herein. The communication unit 703 is used to support communications between the network side device and other devices, such as communications with the terminal shown in FIG. 4A or FIG. 5A. The network side device may further include a storage unit 701 for storing program codes and data of the network side device.

The processing unit 702 may be a processor or a controller, for example, a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware device or any combination thereof. The processing unit may implement or execute various exemplary logical blocks, modules, and circuits described in connection with the present disclosure. The processor may also be a combination that implements computing functions, such as a combination that includes one or more microprocessors, a combination of DSP and microprocessors, and the like. The communication unit 703 may be a transceiver, a transceiver circuit, a radio frequency chip, etc., and the storage unit 701 may be a memory.

The processing unit 702 is configured to acquire a MAC PDU of a terminal through the communication unit 703, where the MAC PDU is obtained through processing a first PDCP PDU by a first RLC layer entity and a MAC layer entity, the first PDCP PDU is the first PDCP PDU associated with a first PDCP SDU and determined by the terminal through enabling the first RLC layer entity and invoking a PDCP layer entity when detecting that a data duplication transmission function of the PDCP layer entity is activated, and the first PDCP PDU is sent to the first RLC layer entity, and a second RLC layer entity is in an enabled status.

Or, the processing unit 702 is configured to acquire a MAC PDU of a terminal through the communication unit 703, where the MAC PDU is obtained through processing a first RLC SDU by a first RLC layer entity and a MAC layer entity, the first PDCP PDU is the first PDCP PDU from a second RLC layer entity and received by the terminal through enabling the first RLC layer entity and invoking the first RLC layer entity when detecting that a data duplication transmission function of the PDCP layer entity is activated, the second RLC layer entity being in an enabled status.

When the processing unit 702 is a processor, the communication unit 703 is a transceiver, and the storage unit 701 is a memory, the network side device according to the embodiments of the present disclosure may be the network side device shown in FIG. 4B or FIG. 5B.

Figure 8:
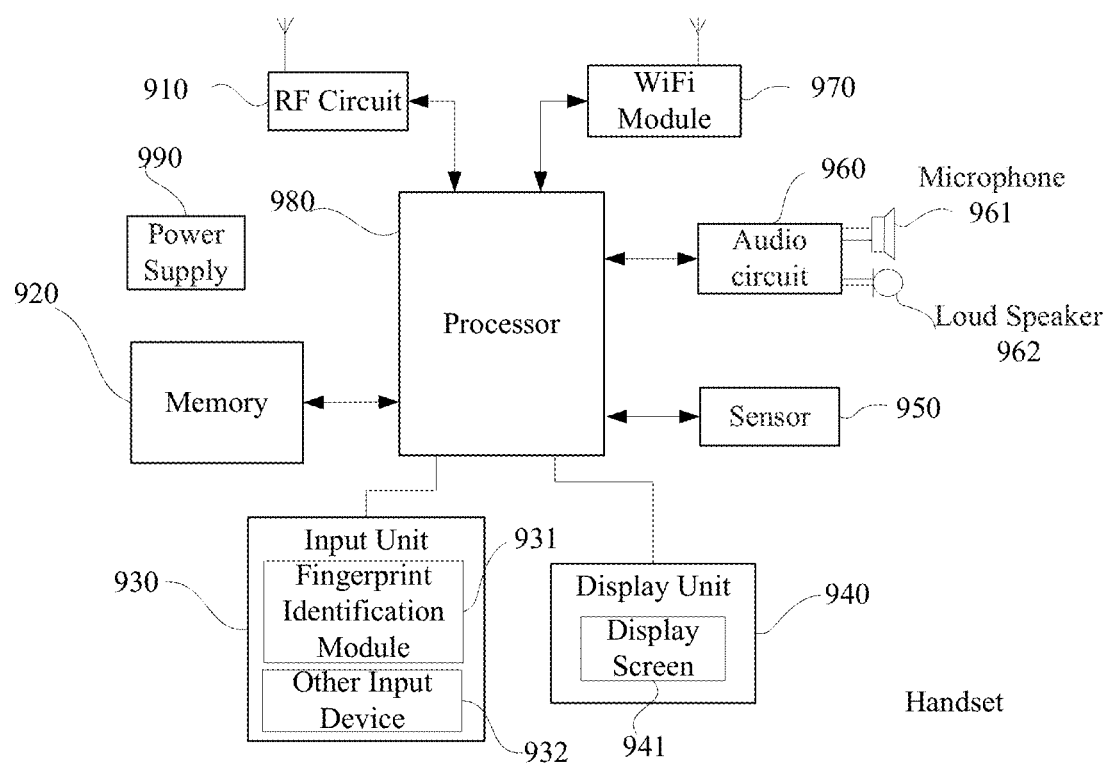
FIG. 8 is a schematic structure diagram of another terminal provided by an embodiment of the present disclosure.

The embodiments of the present disclosure also provide another terminal as shown in FIG. 8. For ease of illustration, only the parts related to the embodiments of the present disclosure are shown. For the specific technical details which are not disclosed, please refer to the method parts of the embodiments of the present disclosure. The terminal may be any terminal device including a handset, a tablet, a Personal Digital Assistant (PDA), a Point of Sales (POS), an on-board computer, and the like. The handset is taken as the terminal for example.

FIG. 8 illustrates a block diagram of a partial structure of a handset related to the terminal provided by the embodiments of the present disclosure. Referring to FIG. 8, the handset includes: a Radio Frequency (RF) circuit 910, a memory 920, an input unit 930, a display unit 940, a sensor 950, an audio circuit 960, a Wireless Fidelity (WiFi) module 970, a processor 980, a power supply 990, and other components. Those skilled in the art can understand that the handset structure shown in FIG. 8 does not constitute a limitation to the handset, and the handset may include more or less than the illustrated components, or combine some components, or have different component arrangements.

The following describes the various components of the handset in details with reference to FIG. 8.

The RF circuit 910 may be configured to receive and send information. In general, the RF circuit 910 includes, but is not limited to, an antenna, at least one amplifier, a transceiver, a coupler, a Low Noise Amplifier (LNA), a duplexer, and the like. Moreover, the RF circuit 910 may also communicate with a network and other devices via wireless communications. The wireless communications above may use any communication standard or protocol, including but not limited to Global System of Mobile Communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be configured to store software programs and modules. The processor 980 runs the software programs and modules stored in the memory 920 to perform various functional applications and data processing of the handset. The memory 920 may mainly include a program storage region and a data storage region. The program storage region may store application programs required by an operating system and at least one function, etc. The data storage region may store data and the like created according to the use of the handset. In addition, the memory 920 may include a high-speed random access memory, and may also include a non-volatile memory, such as at least one disk memory device, a flash memory device, or other volatile solid storage devices.

The input unit 930 may be configured to receive input numeric or character information, and generate key signal inputs related to user settings and function control of the handset. Specifically, the input unit 930 may include a fingerprint identification module 931 and other input device 932. The fingerprint identification module 931 may collect fingerprint data of the user thereon. In addition to the fingerprint identification module 931, the input unit 930 may also include other input device 932. To be specific, other input device 932 may include, but is not limited to, one or more of a touch screen, a physical keyboard, function keys (such as a volume control key, a switching key, etc.), a trackball, a mouse, a joystick, and the like.

The display unit 940 may be configured to display information input by the user or information provided to the user and various menus of the handset. The display unit 940 may include a display screen 941. Optionally, the display screen 941 may be configured in the form of a Liquid Crystal Display (LCD), an Organic Light-Emitting Diode (OLED), or the like. Although in FIG. 8, the fingerprint identification module 931 and the display screen 941 are implemented as two separated components to implement the input and input functions of the handset, in some embodiments, the fingerprint identification module 931 and the display screen 941 may be integrated to achieve the input and play functions of the handset.

The handset may also include at least one sensor 950 such as a light sensor, a motion sensor, and other sensors. Specifically, the light sensor may include an ambient light sensor and a proximity sensor. The ambient light sensor may adjust the brightness of the display screen 941 according to the brightness of the ambient light. The proximity sensor may turn off the display screen 941 and/or backlight when the handset is moved close to an ear. As a motion sensor, an accelerometer sensor may detect the magnitude of acceleration in all directions (usually three axes), and may detect the magnitude and direction of gravity when stationary, and may be configured to identify the application of handset attitude (such as horizontal and vertical screen switching, related games, and magnetometer attitude calibration), vibration recognition related functions (such as pedometer, and tap), etc. As for other sensors such as a gyroscope, a barometer, a hygrometer, a thermometer, and an infrared sensor, which can be configured in the handset, they will not be elaborated herein.

An audio interface between the user and the handset may be provided by the audio circuit 960, a loud speaker 961 and a microphone 962. The audio circuit 960 may convert the received audio data into an electrical signal and transmit the converted electrical signal to the loud speaker 961, and the electrical signal is converted to an acoustical signal and played by the loud speaker 961. On the other hand, the microphone 962 converts the collected acoustical signal into an electric signal, the audio circuit 960 receives the electric signal and converts it into audio data, then the audio data is processed by the playback processor 980, and then the audio data is sent to another handset via the RF circuit 910, or the audio data is played to the memory 920 for further processing.

WiFi is a short-range wireless transmission technology. The handset may help the user to send and receive e-mails, browse web pages, access streaming media, and the like via the WiFi module 970 which provides wireless wideband Internet access for the user. Although FIG. 8 illustrates the WiFi module 970, it can be understood that the WiFi module 970 does not belong to the necessary configuration of the handset and may be omitted as necessary without changing the essence of the present disclosure.

The processor 980 is the control center of the handset, and uses various interfaces and lines to connect various parts of the handset, runs or executes software programs and/or modules stored in the memory 920, and calls data stored in the memory 920 to execute various functions of the handset and process data, thus entirely monitoring the handset. Optionally, the processor 980 may include one or more processing units. Preferably, the processor 980 may integrate an application processor and a modem processor, where the application processor mainly processes an operating system, a user interface, an application program, and the like, while the modem processor mainly processes wireless communications. It is to be understood that the above modem processor may not be integrated into the processor 980 either.

The handset further includes the power supply 990 (such as a battery) for supplying power to various components. Preferably, the power supply may be logically connected to the processor 980 through a power management system, thereby realizing functions of charging and discharging management, and power consumption management and the like through the power management system.

Although not shown, the handset may also include a camera, a bluetooth module, or the like, which will not be elaborated herein.

In the embodiments shown in FIG. 2A, FIG. 2C to FIG. 3, the flow on the terminal side in each step method may be implemented based on the structure of the handset.

In the embodiments shown in FIG. 4A and FIG. 5A, each unit function may be implemented based on the structure of the handset.

The embodiments of the present disclosure further provide a computer readable storage medium, where the computer readable storage medium stores a computer program for electronic data exchange, and the computer program enables a computer to perform some or all of the steps described by the terminal in the above method embodiments.

The embodiments of the present disclosure further provide a computer readable storage medium, where the computer readable storage medium stores a computer program for electronic data exchange, and the computer program enables a computer to perform some or all of the steps described by the network side device in the above method embodiments.

The embodiments of the present disclosure further provide a computer program product, where the computer program product includes a non-transitory computer readable storage medium storing a computer program operable to enable a computer to perform some or all of the steps described by the terminal in the above method embodiments. The computer program product may be a software package.

The embodiments of the present disclosure further provide a computer program product, where the computer program product includes a non-transitory computer readable storage medium storing a computer program operable to enable a computer to perform some or all of the steps described by the network side device in the above method embodiments. The computer program product may be a software package.

The steps of the method or algorithms described in the embodiments of the present disclosure may be implemented in hardware or implemented in a form of executing software instructions by a processor. The software instructions may be composed of corresponding software modules, which may be stored in a Random Access Memory (RAM), a flash memory, a Read Only Memory (ROM), an Erasable Programmable ROM (EPROM), an Electrically Erasable Programmable Read-only Memory (EEPROM), a register, a hard disk, a mobile hard disk, a Compact Disc Read-only Memory (CD-ROM), or any other form of storage medium known in the art. An exemplary storage medium is coupled to the processor to enable the processor to read information from and write information to the storage medium. The storage medium may also be a part of the processor. The processor and the storage medium may be located in an ASIC. In addition, the ASIC may be located in an access network device, a target network device, or a core network device. The processor and the storage medium may also exist as discrete components in the access network device, the target network device or the core network device.

Those skilled in the art should aware that in one or more of the above examples, the functions described in the embodiments of the present disclosure may be implemented in whole or in part by software, hardware, firmware, or any combination thereof. When the functions are implemented using software, it may be implemented in whole or in part in the form of a computer program product. The computer program product includes one or more computer instructions. When the computer program instructions are loaded and executed on a computer, the processes or functions according to the embodiments of the present disclosure are generated in whole or in part. The computer may be a general purpose computer, a special purpose computer, a computer network, or other programmable apparatus. The computer instruction may be stored in a computer readable storage medium or transmitted from one computer readable storage medium to another computer readable storage medium, for example, the computer instruction may be transmitted from one website site, computer, server or data center to another website site, computer, server or data center by wired (e.g., coaxial cable, optical fiber, Digital Subscriber Line (DSL)) or wireless (e.g., infrared, wireless, microwave, etc) manners. The computer readable storage medium may be any available medium that a computer can access or a data storage device such as a server, a data center, or the like that includes one or more available media integration. The available medium may be a magnetic medium (e.g., a floppy disk, a hard disk, a magnetic tape), an optical medium (e.g., a Digital Video Disc (DVD)), or a semiconductor medium (e.g., a Solid status Disk (SSD)) or the like.

The specific embodiments described above have further explained the objects, technical solutions and beneficial effects of the embodiments of the present disclosure in detail. It should be understood that the above is only the specific embodiments of the embodiments of the present disclosure and is not intended to limit the protection scope of the embodiments of the present disclosure. Any modification, equivalent substitution, improvement, etc. made on the basis of the technical solutions of the embodiments of the present disclosure shall be included in the protection scope of the embodiments of the present disclosure.

What is claimed is:

1. A data transmission method, applied to a terminal comprising a Packet Data Convergence Protocol (PDCP) layer entity, a first Radio Link Control (RLC) layer entity, and a second RLC layer entity, wherein the method comprises:
    receiving, by the PDCP layer entity, a second PDCP Service Data Unit (PDCP SDU);
    when a data duplication transmission function of the PDCP layer entity is activated,
    encapsulating, by the PDCP layer entity, the second PDCP SDU into a second PDCP Protocol Data Unit (PDCP PDU), and,
    sending, by the PDCP layer entity, the second PDCP PDU to the first RLC layer entity and the second RLC layer entity,
    wherein after sending, by the PDCP layer entity, the second PDCP PDU to the first RLC layer entity and the second RLC layer entity, the method further comprises:
    when the data duplication transmission function of the PDCP layer entity is deactivated, sending, by the PDCP layer entity, an indication to the first RLC layer entity; and
    receiving, by the first RLC layer entity, the indication, and,
    discarding, by the first RLC layer entity according to the indication, a second RLC SDU associated with the second PDCP PDU in the first RLC layer entity, wherein the second RLC SDU is not encapsulated and processed into an RLC PDU by the first RLC layer entity.

2. The method according to claim 1, wherein the method further comprises:
    when the data duplication transmission function of the PDCP layer entity is deactivated, encapsulating, by the PDCP layer entity, the second PDCP SDU into a second PDCP PDU, and,
    sending, by the PDCP layer entity, the second PDCP PDU to the second RLC layer entity.

3. The method according to claim 1, wherein the encapsulating, by the PDCP layer entity, the second PDCP SDU into a second PDCP PDU comprises:

when the PDCP layer entity satisfies a preset condition, determining, by the PDCP layer entity a pre-stored PDCP PDU copy as a second PDCP PDU associated with the second PDCP SDU,
wherein the preset condition comprises at least one of followings: a discard timer in the PDCP layer entity does not time out, a status report of the PDCP layer entity does not indicate to discard the second PDCP PDU, and the PDCP layer entity does not receive an indication of discarding the second PDCP PDU sent by the second RLC layer entity.

4. The method according to claim 3, wherein the encapsulating, by the PDCP layer entity, the second PDCP SDU into a second PDCP PDU further comprises: when the PDCP layer entity does not satisfy the preset condition, discarding the second PDCP PDU.

5. The method according to claim 1, wherein the second PDCP PDU is configured for the first RLC layer entity to encapsulate the second PDCP PDU into a first RLC PDU and send the first RLC PDU to an MAC layer entity, and the first RLC PDU is configured for the MAC layer entity to encapsulate the first RLC PDU into an MAC PDU and send the MAC PDU; and
the second PDCP PDU is configured for the second RLC layer entity to encapsulate the second PDCP PDU into a RLC PDU and send the RLC PDU to the MAC layer entity.

6. A terminal, comprising a processor, a memory, a communication interface, and one or more programs stored in the memory and configured to be executed by a processor, wherein the programs comprise instructions to:
receive a second Packet Data Convergence Protocol Service Data Unit (PDCP SDU) via a PDCP layer entity;
when a data duplication transmission function of a PDCP layer entity is activated, encapsulate a second PDCP SDU into a second PDCP Protocol Data Unit (PDCP PDU) via the PDCP layer entity; and
send the second PDCP PDU to a first Radio Link Control (RLC) layer entity and a second RLC layer entity via the PDCP layer entity,
wherein the programs further comprise instructions to:
when the data duplication transmission function of the PDCP layer entity is deactivated, send an indication to the first RLC layer entity via the PDCP layer entity; and
receive the indication by the first RLC layer entity, and, discard, by the first RLC layer entity according to the indication, a second RLC SDU associated with the second PDCP PDU in the first RLC layer entity, wherein the second RLC SDU is not encapsulated and processed into an RLC PDU by the first RLC layer entity.

7. The terminal according to claim 6, wherein the programs further comprise instructions to:
when the data duplication transmission function of the PDCP layer entity is deactivated, encapsulate the second PDCP SDU into a second PDCP PDU via the PDCP layer entity, and,
send the second PDCP PDU to the second RLC layer entity via the PDCP layer entity.

8. The terminal according to claim 6, wherein the programs further comprise instructions to:
when the PDCP layer entity satisfies a preset condition, determine a pre-stored PDCP PDU copy as a second PDCP PDU associated with the second PDCP SDU via the PDCP layer entity,
wherein the preset condition comprises at least one of followings: a discard timer in the PDCP layer entity does not time out, a status report of the PDCP layer entity does not indicate to discard the second PDCP PDU, and the PDCP layer entity does not receive an indication of discarding the second PDCP PDU sent by the second RLC layer entity.

9. The terminal according to claim 6, wherein the second PDCP PDU is configured for the first RLC layer entity to encapsulate the second PDCP PDU into a first RLC PDU and send the first RLC PDU to an MAC layer entity, and the first RLC PDU is configured for the MAC layer entity to encapsulate the first RLC PDU into the MAC PDU and send the MAC PDU; and
the second PDCP PDU is configured for the second RLC layer entity to encapsulate the second PDCP PDU into a RLC PDU and send the RLC PDU to the MAC layer entity.

10. A network side device, comprising a processor, a memory, a communication interface, and one or more programs stored in the memory and configured to be executed by a processor, wherein the programs comprise instructions to:
acquire an Media Access Control Protocol Data Unit (MAC PDU) of a terminal, wherein the MAC PDU is obtained through processing a first Packet Data Convergence Protocol Protocol Data Unit (PDCP PDU) by a first Radio Link Control (RLC) layer entity and a MAC layer entity, the first PDCP PDU is associated with a first PDCP Service Data Unit (PDCP SDU) and determined by the terminal through enabling the first RLC layer entity and invoking a PDCP layer entity when detecting that a data duplication transmission function of the PDCP layer entity is activated, and the first PDCP PDU is sent by the terminal to the first RLC layer entity, a second RLC layer entity being in an enabled status,
wherein an indication is sent to the first layer entity by the PDCP layer entity when the data duplication transmission function of the PDCP layer entity is deactivated, and a second RLC SDU associated with the second PDCP PDU in the first RLC layer entity is discarded by the first RLC layer entity according to the indication, wherein the second RLC SDU is not encapsulated and processed into an RLC PDU by the first RLC layer entity.

* * * * *